(12) United States Patent
Langevin

(10) Patent No.: US 10,569,840 B2
(45) Date of Patent: Feb. 25, 2020

(54) STORAGE AND SEATING SYSTEM

(71) Applicant: TRACKER MARINE, L.L.C., Springfield, MO (US)

(72) Inventor: Travis Edward Langevin, Springfield, MO (US)

(73) Assignee: TRACKER MARINE, L.L.C., Springfield, MO (US)

( * ) Notice: Subject to any disclaimer, the term of this patent is extended or adjusted under 35 U.S.C. 154(b) by 0 days.

(21) Appl. No.: 15/686,888

(22) Filed: Aug. 25, 2017

(65) Prior Publication Data
US 2019/0061883 A1 Feb. 28, 2019

(51) Int. Cl.
B63B 29/04 (2006.01)
B60R 7/04 (2006.01)
A47C 7/02 (2006.01)
A47C 7/62 (2006.01)
B63B 25/00 (2006.01)

(52) U.S. Cl.
CPC .............. B63B 29/04 (2013.01); A47C 7/02 (2013.01); A47C 7/62 (2013.01); B60R 7/043 (2013.01); B63B 25/00 (2013.01); B63B 2029/043 (2013.01)

(58) Field of Classification Search
CPC .... B63B 2029/043; B63B 17/00; B60R 7/043
USPC .............. 297/188.04, 188.09, 188.1
See application file for complete search history.

(56) References Cited

U.S. PATENT DOCUMENTS

| | | | |
|---|---|---|---|
| 2,349,766 A | 5/1944 | Simjian | |
| 2,381,667 A * | 8/1945 | Jensen | F25C 1/24 294/161 |
| 2,429,050 A | 10/1947 | Decker | |
| 2,642,584 A * | 6/1953 | Petersen | A47C 17/138 5/17 |
| 2,691,175 A | 10/1954 | Brahm et al. | |
| 2,720,659 A * | 10/1955 | Brown | A47C 17/136 297/118 |
| 3,094,354 A * | 6/1963 | Bernier | A47C 17/165 297/112 |
| 3,346,889 A * | 10/1967 | Gran | A47C 17/136 5/12.1 |

(Continued)

FOREIGN PATENT DOCUMENTS

| | | |
|---|---|---|
| GB | 411042 | 5/1934 |
| GB | 672185 | 5/1952 |
| JP | 2002-355143 | 12/2002 |

Primary Examiner — Timothy J Brindley
(74) Attorney, Agent, or Firm — Pillsbury Winthrop Shaw Pittman LLP

(57) ABSTRACT

A seating and storage system for a marine vehicle is provided. The seating and storage system includes a seat and a seatback located at the rear portion of the seat. The seatback has a base portion and a movable cover. The base portion has a storage compartment therein and the movable cover is configured to cover an opening in the base portion. The cover is movable between an open position and a closed position. The seatback has a rear surface and a hinge assembly that movably connects the cover to the base portion. The hinge assembly is configured in such that in a fully open position, the cover is entirely positioned on a seat side of the rear surface of the seat back. The hinge assembly is configured to retain the cover in a fully open position in a manner that does not impinge upon the boat side support structure.

29 Claims, 11 Drawing Sheets

(56) References Cited

U.S. PATENT DOCUMENTS

| | | | |
|---|---|---|---|
| 3,733,624 A | 5/1973 | Trabin | |
| 3,951,448 A * | 4/1976 | Hawie | B60N 2/4613 |
| | | | 297/113 |
| 4,619,623 A | 10/1986 | Elverskog | |
| 4,717,202 A * | 1/1988 | Batchelder | A47C 11/00 |
| | | | 297/182 |
| 4,919,068 A | 4/1990 | Lathers | |
| 4,974,903 A | 12/1990 | Lipschitz et al. | |
| 5,222,782 A * | 6/1993 | Shrader | A47C 1/16 |
| | | | 297/188.1 |
| 5,303,976 A | 4/1994 | Nobile et al. | |
| 5,458,395 A | 10/1995 | Skarda, Jr. | |
| 5,842,743 A | 12/1998 | Wright et al. | |
| D472,395 S * | 4/2003 | Wills | D6/336 |
| 6,594,833 B2 * | 7/2003 | Timoshenko | A47C 17/161 |
| | | | 5/52 |
| 6,718,570 B2 | 4/2004 | Brooks | |
| 6,918,160 B1 | 7/2005 | Clark | |
| 6,929,321 B1 | 8/2005 | Shrock | |
| 7,523,985 B2 * | 4/2009 | Bhatia | B60N 2/206 |
| | | | 297/188.04 |
| 8,616,143 B2 | 12/2013 | Hancock, Jr. et al. | |
| 9,073,608 B1 | 7/2015 | Foss et al. | |
| 9,260,166 B1 * | 2/2016 | Fodor | B63B 29/04 |
| 9,487,273 B1 * | 11/2016 | Eekhoff | B63B 29/04 |
| 9,688,168 B2 * | 6/2017 | Gratz | B60N 2/309 |
| 2008/0066672 A1 * | 3/2008 | Eekhoff | B63B 29/04 |
| | | | 114/363 |
| 2009/0115229 A1 * | 5/2009 | Messner | A47C 7/62 |
| | | | 297/188.1 |
| 2013/0160695 A1 * | 6/2013 | Gratz | B63B 17/00 |
| | | | 114/362 |
| 2015/0115672 A1 * | 4/2015 | Di Candia | B62J 1/12 |
| | | | 297/188.1 |

* cited by examiner

STORAGE AND SEATING SYSTEM

BACKGROUND

Field

The present patent application generally relates to storage systems. More particularly, the present patent application provides a storage and seating system for a marine vehicle.

Marine vehicles generally have a limited amount of storage space. To create more storage space, it is known to have storage compartments under seats and under hatches. The seat or hatch is typically hinged or removable to access the storage compartments underneath. This requires the passenger to stand and/or to move the seat so as to access the storage compartment.

The present patent application provides improvements over prior art systems and methods.

SUMMARY

One aspect of the present patent application provides a seating and storage system for marine vehicles. The seating and storage system comprises a seat, a seatback disposed at a rear portion of the seat, and a hinge assembly. The seatback includes a base portion and a movable cover. The base portion has a storage compartment therein. The movable cover is configured to cover an opening in the base portion. The cover is movable between an open position permitting access to the storage compartment and a closed position preventing access to the storage compartment. The seatback has a rear surface. The hinge assembly is constructed and arranged to movably connect the cover to the base portion. The hinge assembly is configured such that in a fully open position, the cover is entirely positioned on a seat side of the rear surface of the seat back.

Another aspect of the present patent application provides a marine vehicle. The marine vehicle comprises a boat assembly and a hinge assembly. The boat assembly includes a hull, a floor, driver's cockpit, seating and boat side support structure. The seating comprises a seat and a seatback. The seatback has a rear surface disposed adjacent to or contacting the boat side support structure. The boat side support structure extends higher than the seatback. The seatback comprises a base portion and a movable cover. The base portion has a storage compartment therein. The movable cover is configured to cover an opening in the base portion. The movable cover is movable between an open position permitting access to the storage compartment and a closed position preventing access to the storage compartment. The hinge assembly is constructed and arranged to movably connect the cover to the base portion. The hinge assembly is configured to retain the cover in a fully open position in a manner that does not impinge upon the boat side support structure.

Yet another aspect of the present patent application provides a marine vehicle. The marine vehicle comprises a boat assembly. The boat assembly comprises a hull, a floor, and seating. The seating comprises a seat, a seatback, and a hinge assembly. The seat comprises a seat pad and a seat frame for supporting the seat pad thereon. The seatback is disposed at a rear portion of the seat. The seatback comprises a base portion and a movable cover. The base portion has a storage compartment therein. The movable cover is configured to cover an opening in the base portion. The movable cover is movable between an open position permitting access to the storage compartment and a closed position preventing access to the storage compartment. The hinge assembly is constructed and arranged to movably connect the movable cover to the base portion. The seat frame is fixed relative to the floor on which the seat frame is mounted.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. In addition, as used in the specification and the claims, the term "or" means "and/or" unless the context clearly dictates otherwise. It should also be appreciated that some of the components and features discussed herein may be discussed in connection with only one (singular) of such components, and that additional like components which may be disclosed herein may not be discussed in detail for the sake of reducing redundancy.

DETAILED DESCRIPTION OF THE DRAWINGS

Figure 1A:
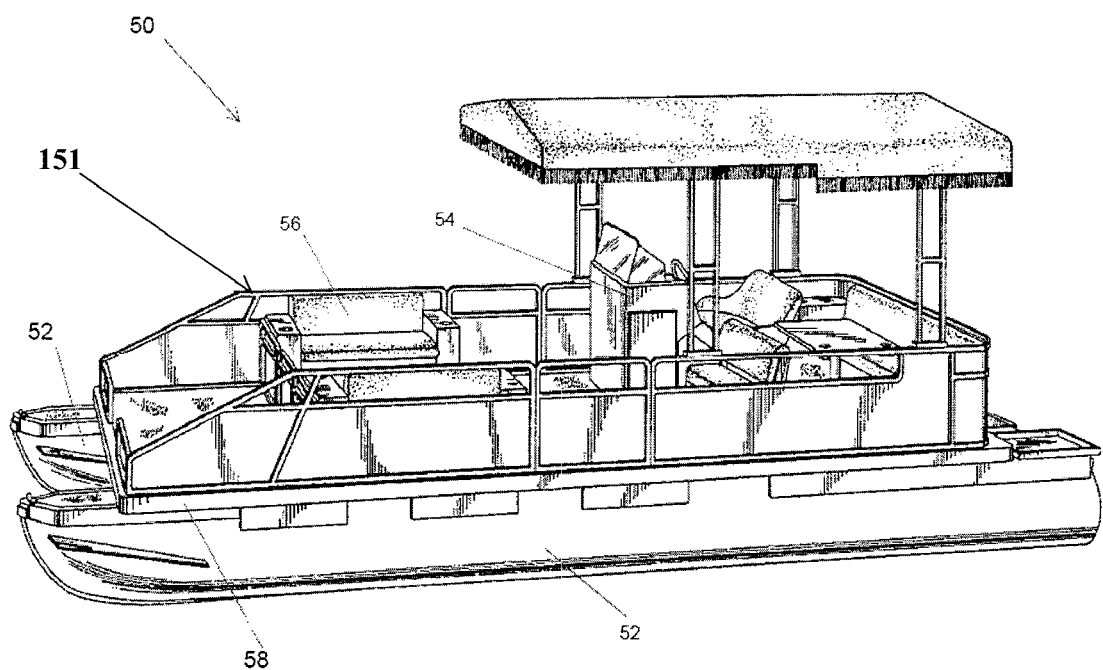
FIG. 1A is a perspective view of a marine vehicle in accordance with an embodiment of the present patent application.
Figure 1B:
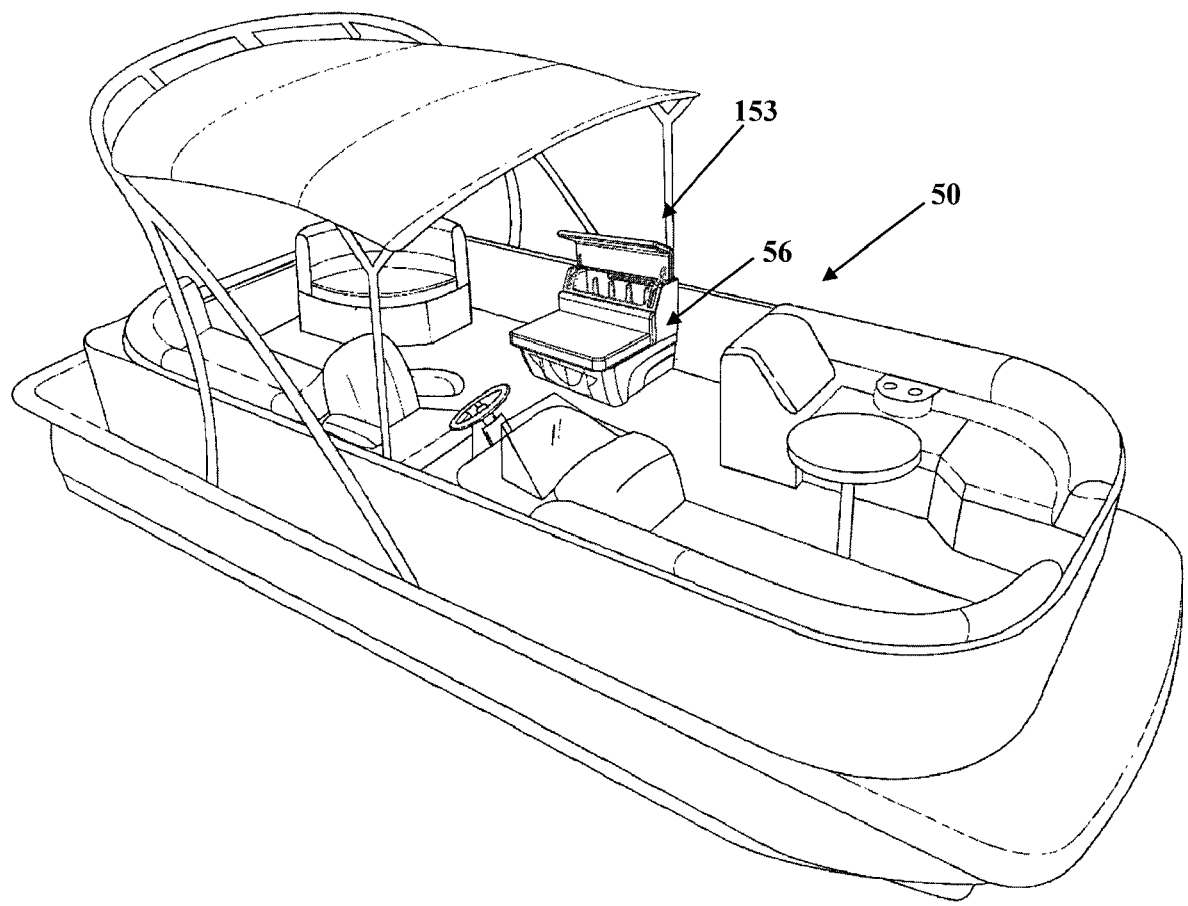
FIG. 1B is a perspective view of a marine vehicle in accordance with another embodiment of the present patent application.
Figure 2:
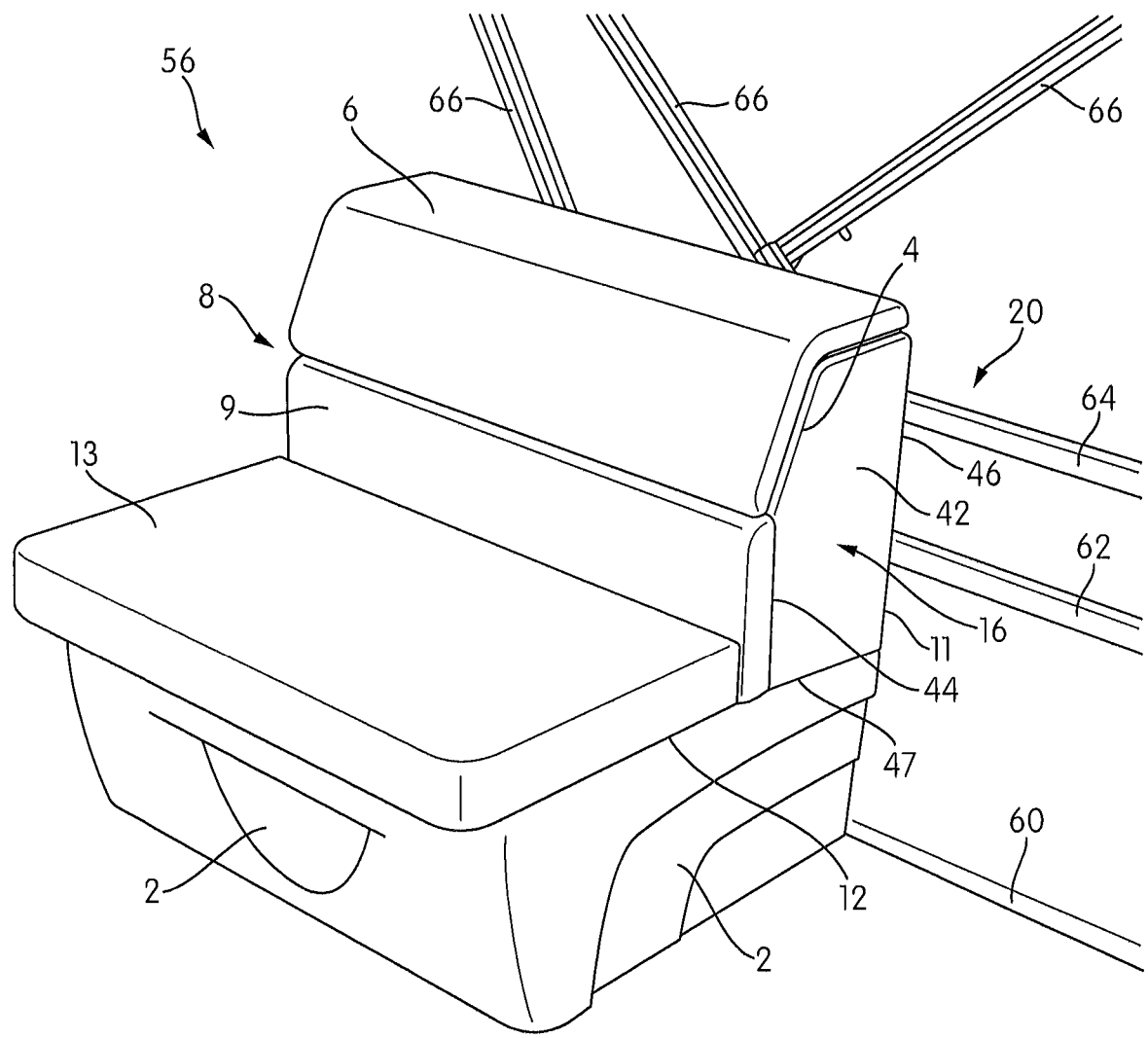
FIG. 2 is a perspective view of a storage and seating system of the marine vehicle in accordance with an embodiment of the present patent application, where a moveable cover of the storage and seating system is in a closed position.
Figure 3:
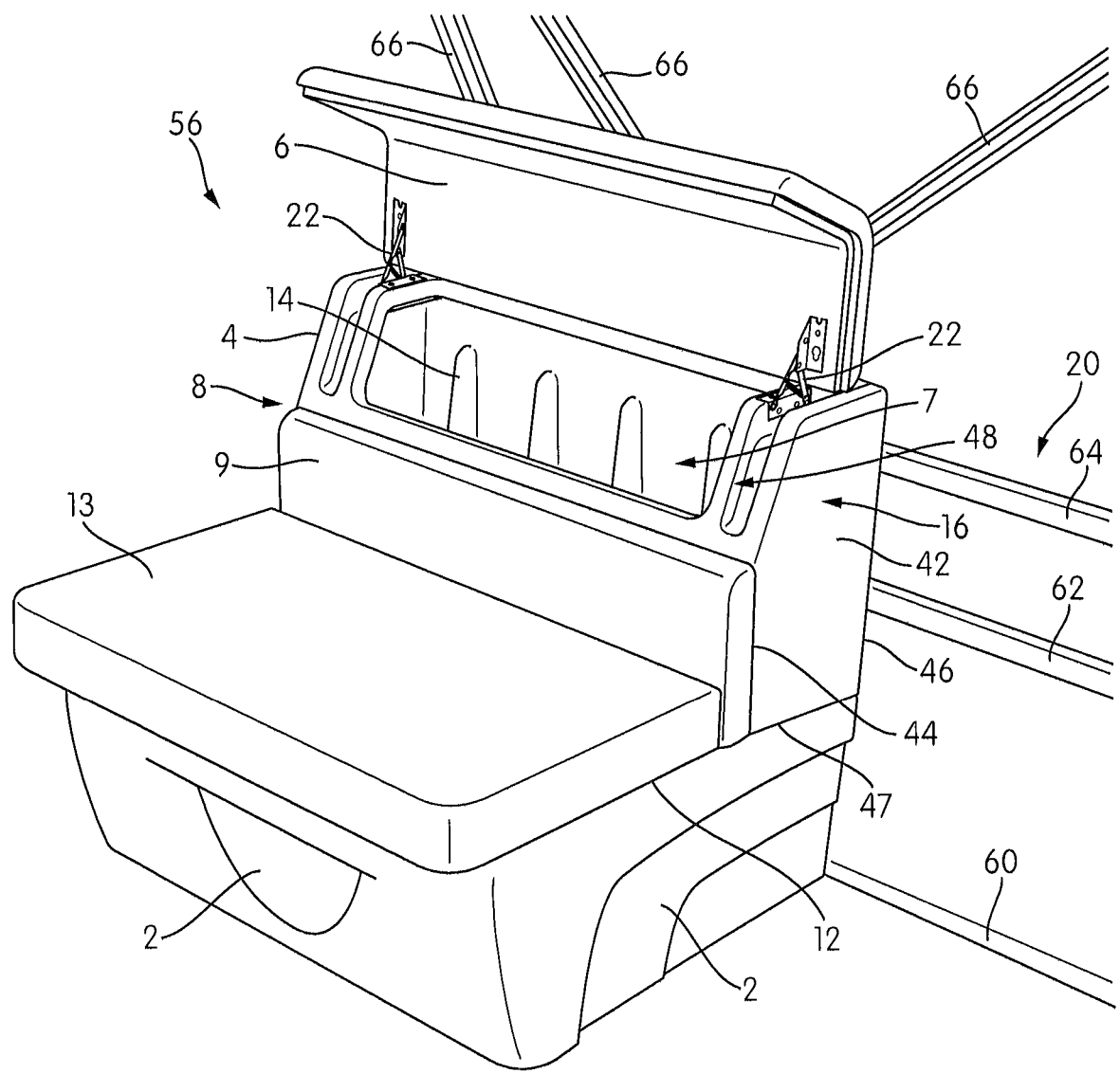
FIG. 3 is a perspective view of the storage and seating system in accordance with an embodiment of the present patent application, where the moveable cover of the storage and seating system is in a fully open position.
Figure 4:
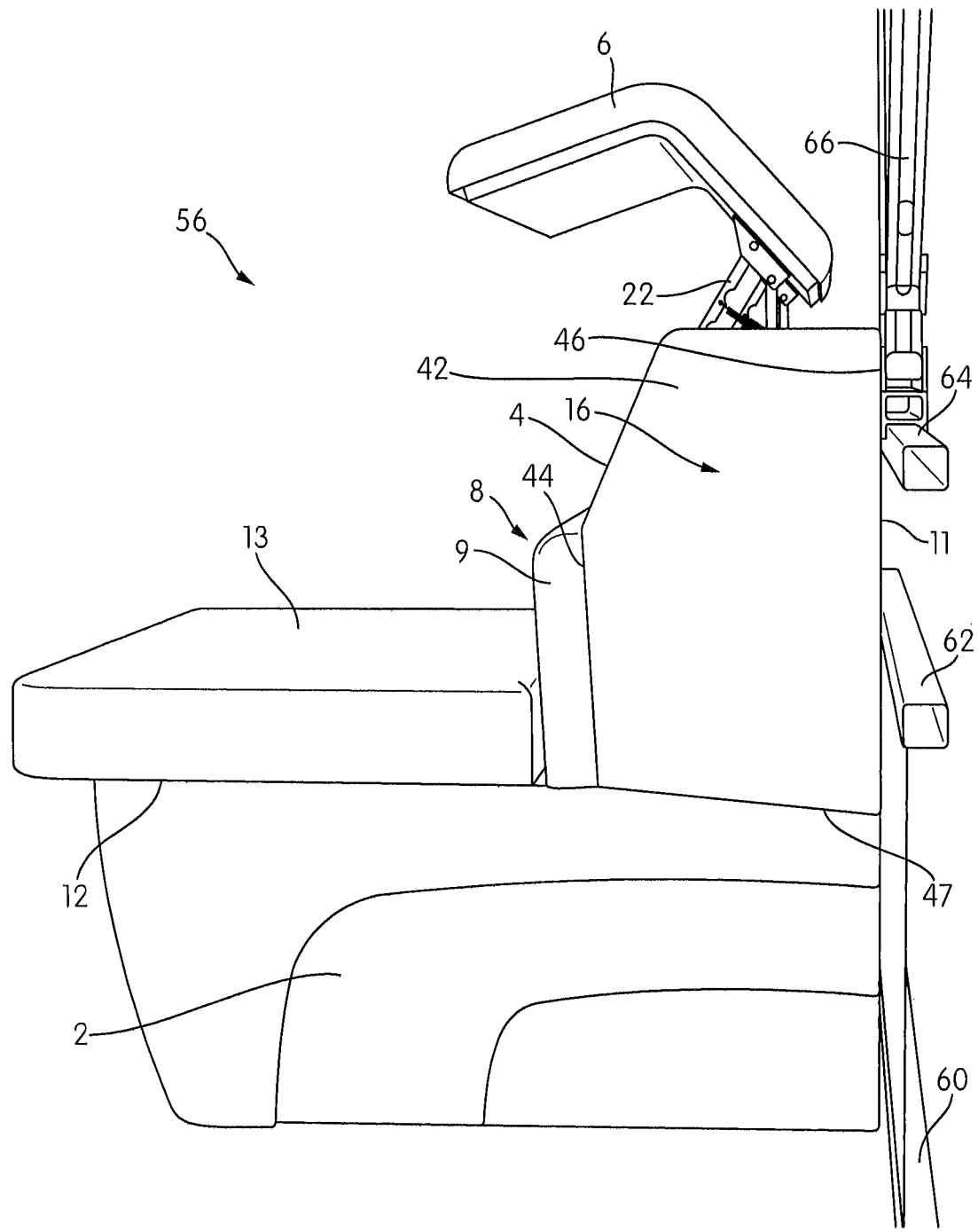
FIG. 4 is a side view of the storage and seating system in accordance with an embodiment of the present patent application, where the moveable cover of the storage and seating system is in a partially open position (or an intermediate position)
Figure 5:
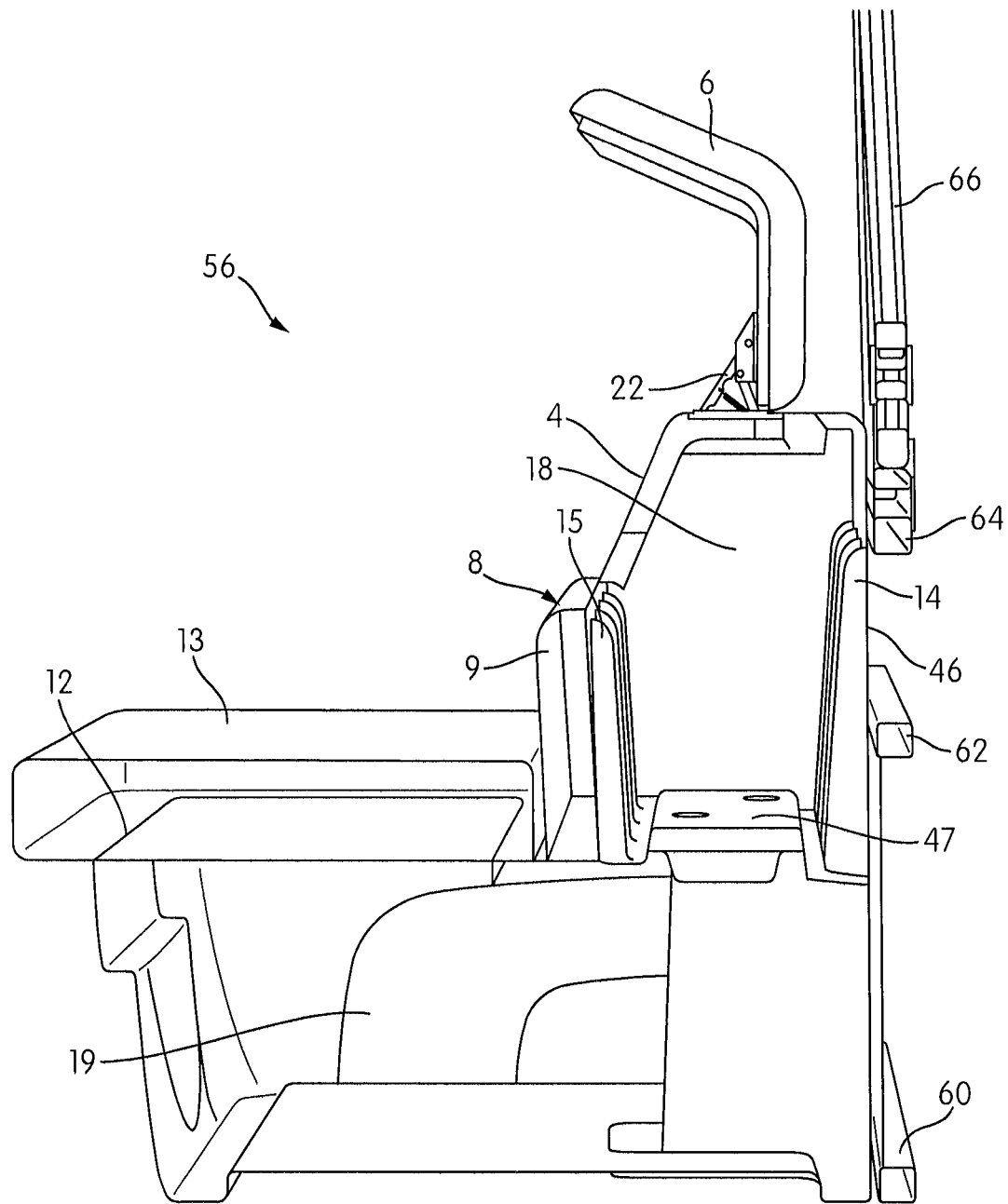
FIG. 5 is a cross-sectional side view of the storage and seating system in accordance with an embodiment of the present patent application, where the moveable cover of the storage and seating system is in the fully open position.
Figure 6:
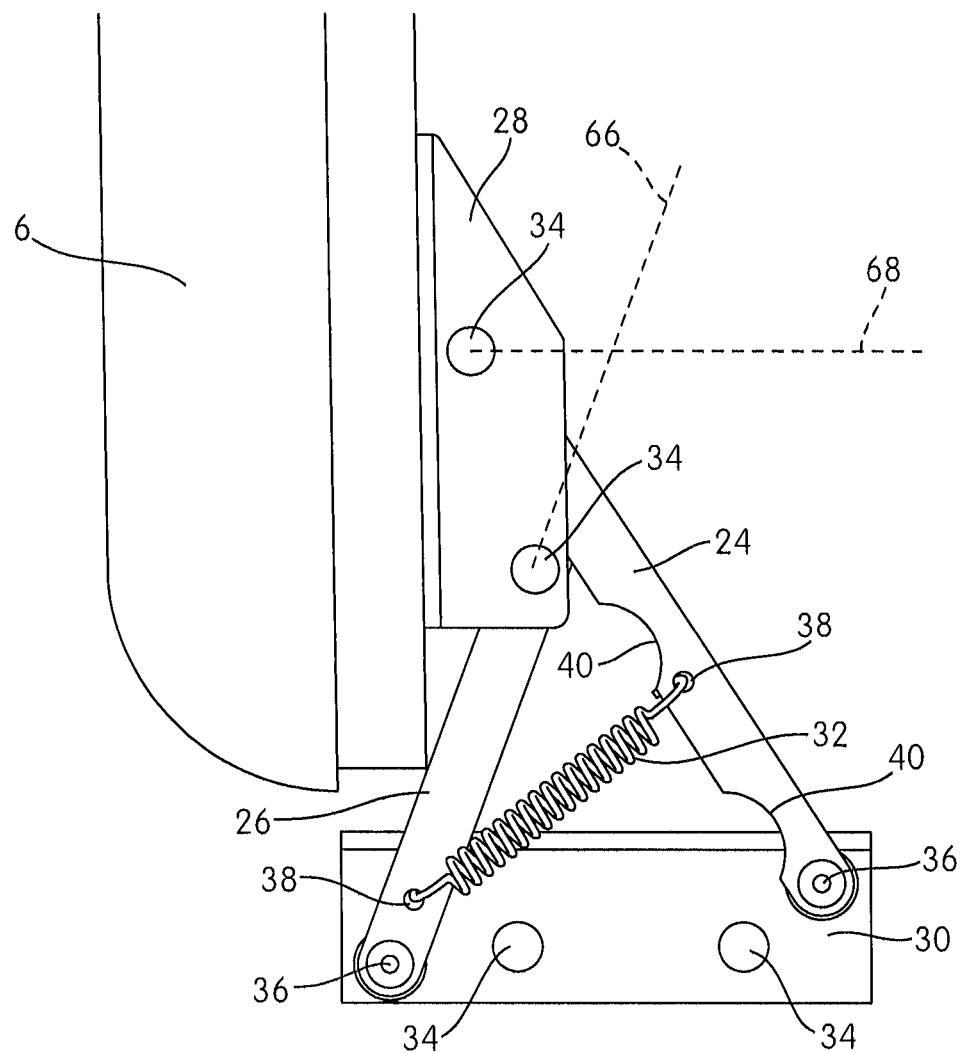
FIG. 6 is a side view of a hinge assembly that movably connects the cover of the storage and seating system and a base portion of the storage and seating system in accordance with an embodiment of the present patent application, where the moveable cover of the storage and seating system is in the fully open position.
Figure 7:
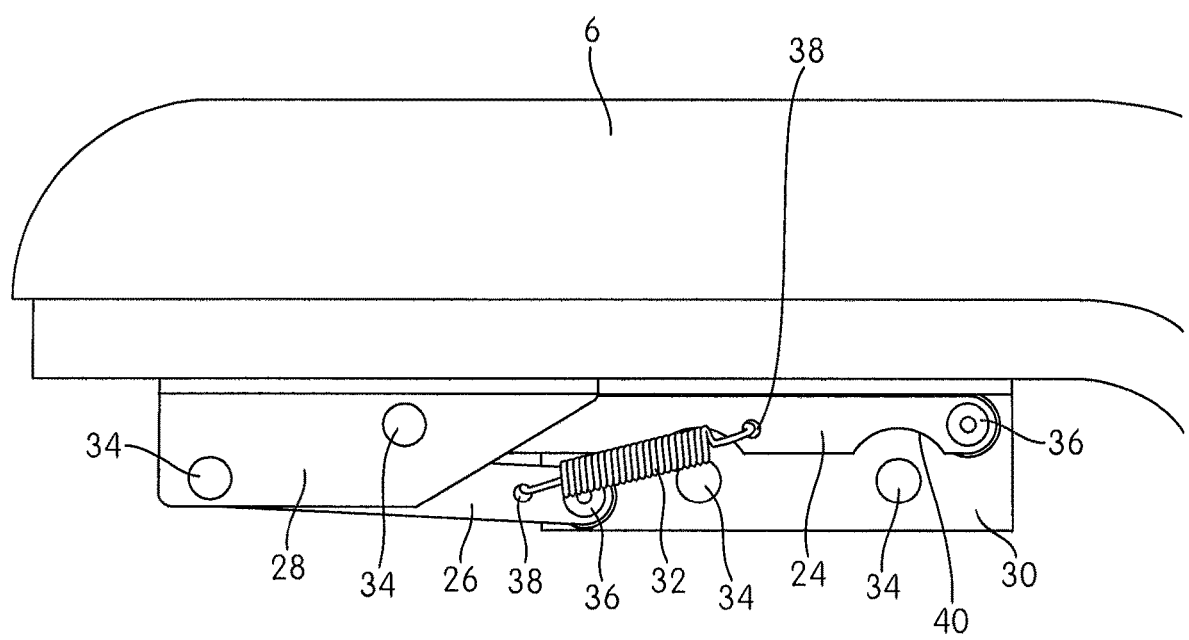
FIG. 7 is a side view of the hinge assembly in accordance with an embodiment of the present patent application, where the moveable cover of the storage and seating system is in the closed position.

A marine vehicle in accordance with the present disclosure is shown in FIGS. 1A and 1B. The marine vehicle includes a boat assembly 50. The boat assembly 50 includes a hull 52, a floor 58, a driver's cockpit 54, and a seating and storage system 56. In one embodiment, the seating comprises a seat 12 and a seatback 8. The seatback 8 is disposed at a rear portion of the seat 12. The seatback 8 has a rear surface 11 disposed adjacent to or contacting a boat side support structure 20. The boat side support structure 20 extends higher than the seatback 8. The seatback 8 comprises a base portion 16 and a movable cover 6. The base portion has a storage compartment 18 therein. The movable cover 6 is configured to cover an opening 7 in the base portion 16. The movable cover 6 is movable between an open position (as shown in FIGS. 3, 5 and 6) permitting access to the storage compartment 18 and a closed position (as shown in FIGS. 2 and 7) preventing access to the storage compartment 18. In one embodiment, the movable cover 6 is movable between a fully open position (as shown in FIGS. 3, 5 and 6), a partially open or an intermediate position (as shown in FIG. 4), and the closed position (as shown in FIGS. 2 and 7). In one embodiment, the movable cover 6 is movable between a plurality of intermediate positions. The hinge assembly 22 is constructed and arranged to movably connect the movable cover 6 to the base portion 16. In one embodiment, the hinge assembly 22 is configured to retain the movable cover 6 in a fully open position in a manner that does not impinge upon the boat side support structure 20. In one embodiment, the hinge assembly 22 is configured such that in a fully open position, the movable cover 6 is entirely positioned on a seat side of the rear surface 11 of the seatback 8.

In one embodiment, as shown in FIG. 1A, the seating and storage system 56 is disposed in front of a support structure 151 of the marine vehicle. In one embodiment, a rearmost surface of the seating and storage system 56 is configured to be in contact with the support structure 151. In one embodiment, as shown in FIG. 1B, the seating and storage system 56 is disposed in front of another structure of the marine vehicle such as a pontoon support or overhang structure 153. In one embodiment, a rearmost surface of the seating and storage system 56 is configured to be in contact with the pontoon support structure 153.

In one embodiment, the storage compartment 18 is accessible without having to move the seat 12. That is, the present patent application enables access to the storage contents in the storage compartment 18 while the passenger remains seated in the seat 12. In one embodiment, the movable cover 6 of the storage compartment 18, when in an open position, is constructed and arranged to not impinge upon the marine vehicle's side support structure 20.

In one embodiment, the seat 12 includes a seat pad/cushion and a seat frame for supporting the seat pad/cushion thereon. In one embodiment, the seat pad/cushion is configured to be pivotable/movable to access an underseat storage (disposed under the seat pad/cushion) as will be described in detail below. In one embodiment, the seat frame of the seat 12 is fixed relative to the floor or the boat deck on which the seat 12 is mounted. In one embodiment, the seat frame of the seat 12 is configured to remain fixed, under the weight of the passenger/user seated on the seat pad/cushion of the seat 12, relative to the floor or the boat deck on which the seat 12 is mounted. In one embodiment, the seat frame of the seat 12 is configured to not rotate or move under the weight of the passenger/user seated on the seat pad/cushion of the seat 12. In one embodiment, the seat frame of the seat 12 cannot move in any direction relative to the floor or the boat deck on which the seat 12 is mounted. In one embodiment, the seat frame of the seat 12 cannot rotate in any angle relative to the floor or the boat deck on which the seat 12 is mounted.

Figure 9:
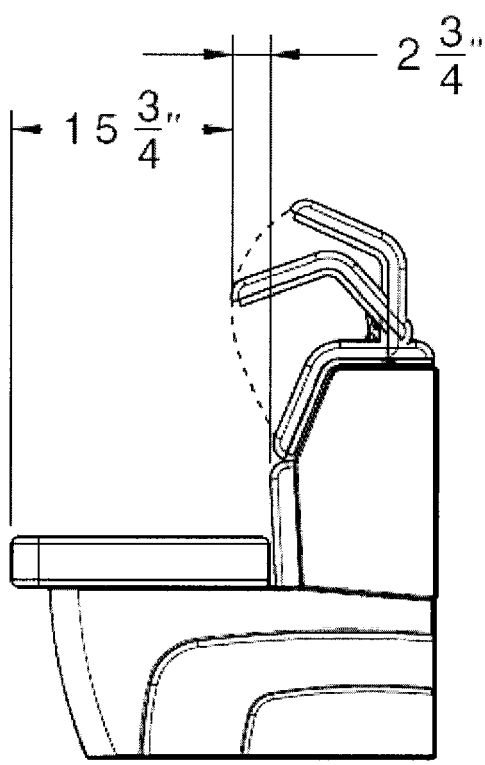
FIG. 9 is another side view of the storage and seating system of the marine vehicle in accordance with an embodiment of the present patent application.

FIG. 9 shows a side view of the storage and seating system of the marine vehicle in accordance with an embodiment of the present patent application. In one embodiment, the seat or seat pad/cushion has a width of 18½ inches. In one embodiment, the arc of the tip of the seatback moves 2¾ inches forwardly, in the direction of the seat. In one embodiment, a seat width of 15¾ inches is still left for the user to comfortably occupy/use/sit when opening the seat back. In one embodiment, the seat width of 15¼ inches is still left for the user so that the user sitting on the seat does not need to move or get up from the seat when opening the seat back.

In one embodiment, the dimensions described in the present patent application, are up to 5 percent greater than or up to 5 percent less than those described above. In one embodiment, the dimensions described in the present patent application, are up to 10 percent greater than or up to 10 percent less than those described above. In one embodiment, the dimensions described in the present patent application, are up to 20 percent greater than or up to 20 percent less than those described above. In one embodiment, all the dimensions shown in the present patent application are in inches.

Figure 10:
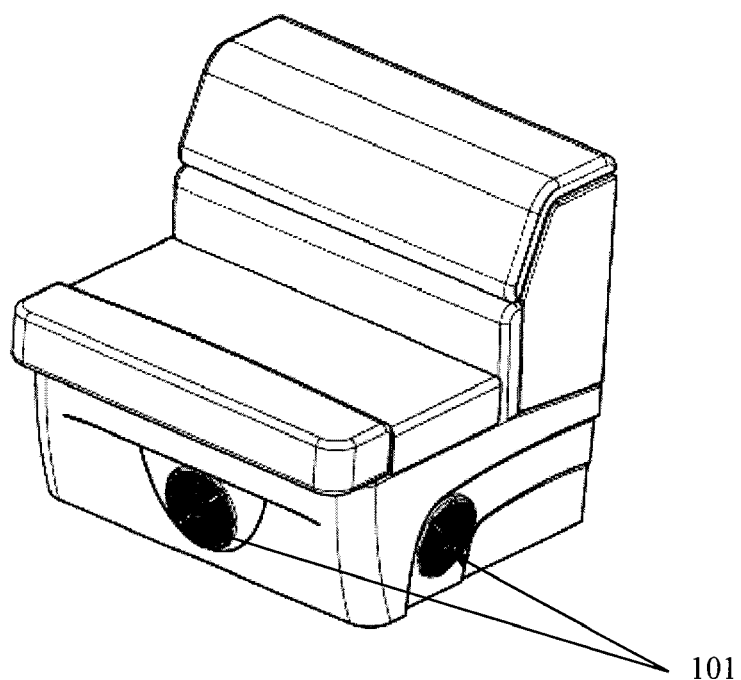
FIG. 10 is another perspective view of the storage and seating system of the marine vehicle in accordance with an embodiment of the present patent application, where the moveable cover of the storage and seating system is in the closed position.

FIG. 10 is another perspective view of the storage and seating system of the marine vehicle in accordance with an embodiment of the present patent application. In one embodiment, speakers 101 may be mounted under the seat as shown in FIG. 10. In one embodiment, FIGS. 9 and 10 are drawn to the scale of 1:16.

The hull 52 is the main body of the marine vehicle that typically keeps the marine vehicle above water. It generally is watertight and can be made of many materials such as aluminum, wood, fiberglass, and many other materials as would be appreciated by one skilled in the art.

Generally, the floor 58 is mounted to the hull 52. The floor 58 is constructed and arranged to support the driver's cockpit 54 and the seating and storage system 56. The driver's cockpit 54 typically includes a console and a seat where the driver operates the marine vehicle.

In one embodiment, the marine vehicle may have different shapes, sizes and configurations, may have multiple hulls, may have different seating arrangements, may have different cockpit(s), or may have a different floor structure.

In one embodiment, the seating and storage system 56 is shown in FIGS. 2-5. The seating and storage system 56 has a seat frame 2 that is connected to the floor 58. The seat frame 2 is generally attached to the floor 58 using fasteners, welds, rivets, or other similar attachment devices as would be appreciated by one skilled in the art. The seat frame 2 supports the seat 12. The seat 12, shown in FIG. 3, has a seat cushion 13 to make the seat more comfortable. In one embodiment, the seat cushion 13 may be removed, in which case an occupant could sit upon the seat 12, or the seat cushion 13 may be replaced with a seat cushion of a different size, shape, or configuration. In one embodiment, the padding or seat cushion is optional. The seat 12, shown in FIG. 2, is a generally horizontal rectangular seat, although in other embodiments the seat 12 may have different sizes, shapes and configurations, may be inclined, may be adjustable, may be grooved, or may appear as any surface meant for sitting. The seat frame 2 may have different sizes, shapes and configurations. As shown in FIG. 5, the seat frame 2 may have an under-seat storage compartment 19. This under-seat storage compartment 19 could be accessed from the side of the seat 12. For example, movable side cover(s) may cover side opening(s) of the under-seat storage compartment, where the movable side cover may be movably connected to a portion of the floor 58 or the seating and storage system 56 via hinge assemblies (that are similar to the hinge assembly 22). In one embodiment, the under-seat storage compartment 19 is fixed and there is no access to the under-seat storage compartment 19. In one embodiment, the seating and storage system 56 may not have an under-seat storage system. In one embodiment, the movability of the seat is optional.

The seat 12, shown in FIGS. 2-5, has the seatback 8 disposed at a rear portion of the seat 12. The seatback 8 comprises the base portion 16, the moveable cover 6, and a cushioned backrest 9. The cushioned backrest 9 shown in FIG. 2 is a fixed cushion that covers a front wall 44; it may be attached using Velcro, adhesives, or many other attachment devices as would be appreciated by one skilled in the art. As shown in FIG. 2, the cushioned backrest 9 and the moveable cover 6 provide lumbar support for the occupant. In one embodiment, the cushioned backrest 9 may be angled, may have different sizes, shapes, and configurations, may extend further vertically or horizontally, or may be entirely replaced by the moveable cover 6 or the front wall 44, either of which could then act as the backrest 9. In one embodiment, where the moveable cover 6 replaces the backrest 9, the vertical length of the moveable cover 6 is generally extended (e.g., downwardly). In one embodiment, where the front wall 44 replaces the backrest 9, the cushion is removed and the surface of the front wall 44 becomes the backrest 9 and provides support to the occupant. In one embodiment, the backrest 9 is optional. That is, the seatback 8 has the lower fixed portion 9 providing the primary back support (e.g., lumbar support) to the passenger/use and the upper movable portion 6. In another embodiment, the upper movable cover 6 includes the lower lumbar portion (i.e., placed above where the backrest 9 is described).

FIG. 2 shows one embodiment of the seatback 8, where the seatback 8 has the base portion 16 that forms the casing for the storage compartment 18. The base portion 16, shown in FIG. 2 comprises side walls 42, the front wall 44, a rear wall 46, and lip 48. The front wall 44 is a rigid structure that forms the front portion of the base portion 16. The side walls 42 are rigid structures that form the side portions of the base portion 16. The rear wall 46 is a rigid structure that forms the rear portion of base portion 16. The lip 48 is a structure of the base portion 16 that the moveable cover 6 rests upon when the moveable cover 6 is in the closed position. As shown in FIG. 3, the lip 48 runs along the circumference of the opening 7. The lip 48 could be replaced with tabs, indentations, or many other structures, as would be appreciated by one skilled in the art, that would provide a stopping point for the moveable cover 6 when the moveable cover 6 is moved to the closed position. In one embodiment, the lip is configured to be a water routing feature for drier storage.

The base portion 16 has the opening 7 (shown in FIG. 3) that allows access to the storage compartment 18. In one embodiment, the depth, height, width, and thickness of the side walls 42, the front wall 44, and the rear wall 46 of the base portion 16 could vary to change the dimensions of the storage compartment 18, the seat 12, the moveable cover 6, the seatback 8, or for many other structural or aesthetic reasons. As shown in FIGS. 3 and 5, the base portion 16 has front wall supports 15 and rear wall supports 14, these supports may add structural integrity to the front wall 44 and rear wall 46 respectively. In one embodiment, these wall supports may appear differently, may vary in number, may have a different purpose such as water removal, or be removed. The seatback 8 can be attached to the seat 12 and/or to the seat frame 2 through fasteners, adhesives, other attachment mechanisms as would be appreciated by one skilled in the art, or could be unattached.

As shown in FIG. 3, in one embodiment, the opening 7 is at the uppermost vertical and horizontal structure of the base portion 16 and also resides in an angled portion 4 of the seat back 8. From FIGS. 3 and 4, it can be appreciated that, in the illustrated embodiment, the opening 7 resides in two intersecting planes, an upper horizontal plane at the top of the seatback 8, and in an angled plane, extending downwardly from the upper horizontal plane at an oblique angle as shown. The opening 7 as shown in FIG. 3 is one embodiment. In one embodiment, the opening 7 may appear elsewhere on the base portion 16, it may occupy more than 2 planes, may have a different sizes, shapes or configurations, may be segmented to have multiple openings, may be larger or smaller, or may have many other possible layouts. The opening 7 can be closed by the moveable cover 6 that is attached to the base portion 16 by the hinge assembly 22. The moveable cover 6 may appear as in FIG. 2 where it generally matches the geometry of the opening 7 and substantially encloses the opening 7. In one embodiment, the moveable cover 6 may not substantially enclose the opening 7 or it may have a different geometry than the opening 7. In one embodiment, the cover 6 is made of fiberglass. In one embodiment, the cover 6 may be made of other materials such as wood, metal, or many other materials as would be appreciated by one skilled in the art.

The opening 7 allows access to the storage compartment 18. In one embodiment, the storage compartment 18 could have multiple openings 7 and multiple movable covers 6. The storage compartment 18 could be appear as shown in FIG. 3 as a compartment enclosed by the base portion 16 and the moveable cover 6, with limitation on the vertical depth provided by the bottom wall 47. In one embodiment, the storage compartment 18 may appear as segmented storage compartments, may have different geometries to facilitate certain objects such as indentations for an anchor or a rope, may have watertight seals to facilitate storage of ice and liquids, or many other possible configurations and features. The casing of the storage compartment 18 may be made of many different materials such as fiberglass, metal, plastic, etc. In one embodiment, the vertical depth of the storage compartment 18 could be extended or lessened by moving the bottom wall up 47 or down respectively. In one embodiment, the storage compartment 18 could extend all the way down to the floor 58 for storage of taller items, or the storage compartment 18 could be extended to be combined with the under-seat storage compartment 19.

As shown in FIG. 4, in one embodiment, the seatback 8 has the rear surface 11 that is flush with the side support structure 20. The side support structure 20, shown in FIG. 4, comprises a lower horizontal railing 60, middle horizontal railing 62, an upper horizontal railing 64, and angled support structures 66. As shown in FIG. 4, the lower horizontal railing 60, the middle horizontal railing 62, and the upper horizontal railing 64 are in contact with seatback rear surface 11. In one embodiment, the side support structure 20 may not be in contact with the storage and seating system 56. In one embodiment, the rear surface 11 of the seatback 8 could be connected to the side support structure 20, using fasteners, adhesives, not be attached at all but still be in contact, or be in contact with another superstructure fixture such as a pontoon support or overhang. In one embodiment, the lower horizontal railing 60, the middle horizontal railing 62, the upper horizontal railing 64, and the angled support structures 66 may have different sizes, shapes and configurations, may be replaced with a different superstructure fixtures, or may be orientated differently to the storage and seating system 56.

Referring to FIGS. 2-5, a generally vertical force must be applied to the cover 6 to move the cover 6 from its closed position as shown FIGS. 2 and 7 to a partially-open position as shown FIG. 4 and to the open position as shown in FIGS. 3, 5 and 6. This force could be provided by an individual(s) or in alternative embodiments the force could be applied with a servo or other force applying mechanisms. The cover 6 is pivotable due to the hinge assembly 22. When a generally vertical force is applied to the cover 6 the hinge assembly 22 pivots and goes from a generally horizontal position shown in FIG. 7 to a more vertical position shown in FIG. 6. In one embodiment, the hinge assembly 22 may also be referred to as a linkage assembly. In one embodiment, the hinge assembly 22 may be a four bar linkage assembly as will be described in detail below.

When the moveable cover 6 is in the open position shown in FIGS. 3, 5 and 6, an occupant can substantially access the storage compartment 18. Also, when the moveable cover 6 is in the open position as shown in FIGS. 3, 5 and 6, the opening 7 is substantially exposed and no part of the moveable cover 6 impinges the boat side support structure 20.

When the moveable cover 6 is in the closed position shown in FIGS. 2 and 7, the storage compartment 18 cannot be substantially accessed. Also, when the moveable cover 6 is in the fully closed position as shown in FIGS. 2 and 7, no part of the moveable cover 6 impedes the boat side support structure 20.

To move the moveable cover 6 from the fully open position shown in FIGS. 3, 5 and 6 to the closed position shown in FIGS. 2 and 7, a downward force is applied to the moveable cover 6 and the moveable cover 6 pivots downward.

Figure 8:
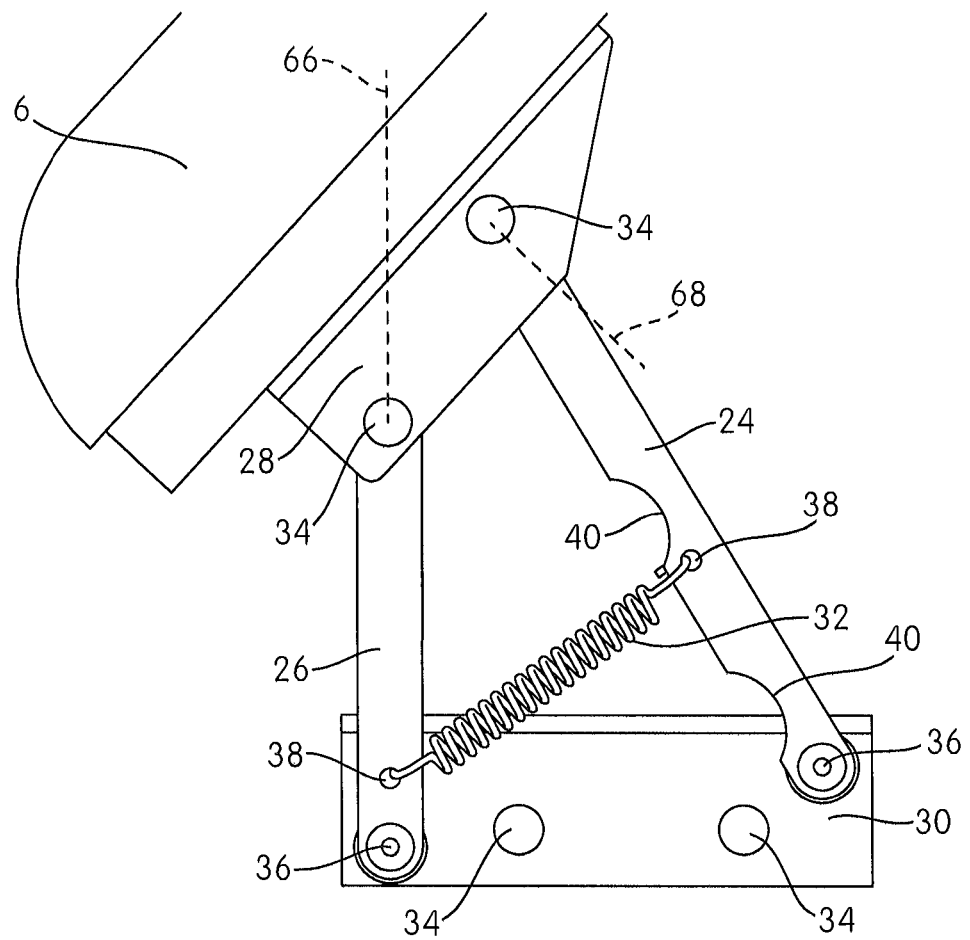
FIG. 8 is a side view of the hinge assembly in accordance with an embodiment of the present patent application, where the moveable cover of the storage and seating system is in the partially open position (or the intermediate position)

The hinge assembly 22 pivots the cover 6 between the closed position shown in FIGS. 2 and 7 and the open position shown in FIGS. 3, 5 and 6. In one embodiment, as shown in FIGS. 6-8, link members of the hinge assembly include a fixed cover mounting link 28, a fixed base portion mounting link 30, a link 24, and a link 28. The mounting link 28 is constructed and arranged to be fixedly connected to the cover 6. The mounting link 30 is constructed and arranged to be fixedly connected to the base portion 16. The link 24 is pivotally connected to both the fixed cover mounting link 28 and the fixed base portion mounting link 30 as shown in FIGS. 6-8, and link 26 is pivotally connected to both the fixed cover mounting link 28 and the fixed base portion mounting link 30. In one embodiment, the link 24 and the link 26 are pinned to both the fixed cover mounting link 28 and the fixed base portion mounting link 30 through fasteners 34 and flanges 36, in alternative embodiments these pins and flanges could be replaced with other rotatable couplings and attachment devices.

As shown in FIGS. 6-7, the links 24 and 26 are generally elongated flat lengths of metal. In one embodiment, the lengths, thicknesses, and widths of the links 24 and 26 may change or vary. In one embodiment, as shown in FIGS. 6-8, the link 24 has a pair of scalloped sections 40 along its length. This configuration allows the link 24 to lay flat as shown in FIG. 7 against the fasteners 34. In one embodiment, these scalloped sections 40 may be removed, may be replaced with a structure having different sizes, shapes and configurations.

The ratio of the first bar length 24 to the second bar length 26, and the mounting location of the link 28 on the cover 6 and the mounting location of the link 30 on the base portion 16 are selected to ensure the cover 6 does not impede the side support structure 20 when the cover is in the open position or in the closed position. As shown in FIG. 6, in one embodiment, the link 24 is longer than the link 26. This difference in length (between the links 24 and 22) combined with the length of the cover mounting link 28 and the base portion mounting link 30 enable the hinge mechanism 22 to move the cover 6 between the open and closed positions without impinging on the side support structure 20 or extending past the seatback rear surface 11.

However, in another embodiment, where there is no side support structure, the hinge assembly 22 can still be used. The hinges could appear as in FIG. 3 or they could be moved closer to the seat 12, or could be moved closer to the seatback rear surface 11. Furthermore, the two hinge assemblies 22 could be mounted as shown in FIG. 3 or could be replaced a single hinge assembly 22; alternatively a single hinge 22 could be mounted centrally or in many different positions. The positions of the hinge assembly 22 could be moved or changed to facilitate an easier opening or closing of the cover 6. The hinge assembly 22 could appear as in FIGS. 6-8 with an over-center spring 32 that keeps the cover 6 in the open position once opened. In one embodiment, the spring 32 could be an over-center spring that helps open the lid and helps stop it from slamming closed, but, in one embodiment, this could be replaced with a catch or with another device that operates for a similar purpose, or it could be removed.

In one embodiment, the hinge assembly 22 includes a spring assist drive linkage mechanism. In one embodiment, the spring assist drive linkage mechanism is configured to operate as an over-center mechanism. In one embodiment, the combination of these link member 24, 26, 28 and 30 also serve as an over center mechanism to retain/lock the moveable cover 6 in the closed position or the moveable cover 6 in the open position.

The over-center spring 32 attaches to the links 24 and 26 through a pair of eyelets 38. As shown in FIG. 6, there is a plane 66 that extends from the link 26, and a plane 68 that extends from the upper cover mounting fastener 34. When the moveable cover 6 moves from the open position shown in FIG. 6 to the semi-open position shown in FIG. 8, the planes 66 and 68 no longer intersect, when the planes 66 and 68 no longer intersect the over-center spring 32 resists the force that is closing the moveable cover 6. When the planes 66 and 68 intersect, as shown in FIG. 6, the over-center spring 32 resists an opening force.

The over-center hinge assembly 22 is configured to turn or move through most of its range in an effortless and torque-free manner. In one embodiment, at a specific position, just before the closed position of the moveable cover 6 is reached, a strong closing torque begins. That is, as soon as the dead or over center position is passed, the closing thrust is produced by the over center hinge assembly 22, so that the moveable cover 6 is forced into the fully closed position. In one embodiment, at a specific position, just before the open position of the moveable cover 6 is reached, a strong opening torque begins. That is, as soon as the dead or over center position is passed, the opening thrust is produced by the over center hinge assembly 22, so that the moveable cover 6 is forced into the fully open position.

In one embodiment, the spring 32 could be attached to links 24 and 26 through alternative methods. In one embodiment, the four-bar linkage hinges 22 could have a different over center-mechanism for locking the cover 6 in the open or closed position, or it could be held in place by hand.

In the embodiment, as shown in FIGS. 2-5, the four-bar linkage hinge assembly 22 is set up so the storage compartment 18 could be accessed while someone is sitting in the seat 12. When the movable cover 6 is moving from the closed position as shown in FIGS. 2 and 7 to the open position as shown in FIGS. 3, 5 and 6, the four bar linkage hinge assembly 22 pivots the cover 6 towards the side support structure 20. The four bar linkage hinge assembly 22 is designed to move the cover 6 substantially vertically so that the arc of the moveable cover 6 does not substantially encompass the seat, this allows an occupant to remain seated while accessing the storage compartment 18.

The four-bar linkage hinge assembly 22 shown in FIG. 7 is in a closed position. To pivot the moveable cover 6 from the closed positon shown in FIGS. 2 and 7 to the open position shown in FIGS. 5 and 6, the four-bar linkage hinge assembly 22 must be rotated from a closed position shown in FIG. 7 to an open position shown in FIG. 6.

When the cover 6 rotates from the opened to the closed position, the four-bar linkage hinge assembly 22 shifts the moveable cover 6 away from the side support structure 20. This configuration ensures that, during this movement of the moveable cover 6, it does not impinge on the side support structure 20.

The four-bar linkage hinge assembly 22 is typically made of metal but could be made of other materials such as a hard plastic, wood, or other materials as would be appreciated by one skilled in the art. The four-bar linkage hinge assembly 22 may appear as in FIG. 7 in the closed position. To move between the closed position shown in FIG. 7 and the open position shown in FIG. 6, the link 24 goes from a generally horizontal position shown in FIG. 7 to a more vertical position shown in FIG. 8 then to a less vertical position but not generally horizontal position shown in FIG. 6. The link 26 goes from a generally horizontal position shown in FIG. 7 to a generally vertical position shown in FIG. 8 to a less vertical position but not generally horizontal position shown in FIG. 6, when it rotates between the closed position shown in FIG. 7 and the open position shown in FIG. 6.

Although the present patent application has been described in detail based on what is currently considered to be the most practical and preferred implementations, it is to be understood that such detail is sole for that purpose and that the patent application is not limited to the disclosed implementations, but, on the contrary is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A seating and storage system for marine vehicles comprising:
   a seat;
   a seatback disposed at a rear portion of the seat, the seatback comprising a base portion and a movable cover, the base portion comprising a bottom wall and a plurality of side walls, the bottom wall and the plurality of side walls defining a storage compartment in the base portion, and the movable cover being configured to cover an opening in the base portion, the movable cover being movable between an open position permitting access to the storage compartment and a closed position preventing access to the storage compartment, the movable cover comprising the entirety of the structure that moves to cover the opening in the base portion, the seatback having a rear surface;
   a hinge assembly constructed and arranged to movably connect the movable cover to the base portion, the hinge assembly being configured such that in a fully open position, the cover is entirely positioned on a seat side of the rear surface of the seat back;
   and wherein the seat is fixed to the base portion.

2. The seating and storage system of claim 1, wherein the hinge assembly includes a four-bar linkage mechanism.

3. The seating and storage system of claim 2, wherein the hinge assembly includes a spring that holds the moveable cover in the open position.

4. The seating and storage system of claim 3, wherein the spring is an over-center spring.

5. The seating and storage system of claim 1, further comprising a boat side support structure that is behind the rear surface of the seatback.

6. The seating and storage system of claim 5, wherein the boat side support structure is a pontoon support.

7. The seating and storage system of claim 1, the seatback includes a lower fixed portion that provides back support to a passenger.

8. A marine vehicle comprising:
   a boat assembly, the boat assembly comprising a hull, a floor, driver's cockpit, seating and boat side support structure,
   the seating comprising a seat and a seatback,
   the seatback having a rear surface disposed adjacent to or contacting the boat side support structure, the side support structure extending higher than the seatback,
   the seatback comprising a base portion and a movable cover, the base portion comprising a bottom wall and a plurality of side walls, the bottom wall and the plurality of side walls defining a storage compartment in the base portion, the movable cover being configured to cover an opening in the base portion, the movable cover being movable between an open position permitting access to the storage compartment and a closed position preventing access to the storage compartment, the movable cover comprising the entirety of the structure that moves to cover the opening in the base portion;
   a hinge assembly constructed and arranged to movably connect the movable cover to the base portion, the hinge assembly being configured to retain the movable cover in a fully open position in a manner that does not impinge upon the boat side support structure;
   and wherein the seat is fixed to the base portion.

9. The marine vehicle of claim 8, wherein the hinge assembly includes a four-bar linkage mechanism.

10. The marine vehicle of claim 9, wherein the hinge assembly includes a spring that holds the moveable cover in the open position.

11. The marine vehicle of claim 10, wherein the spring is an over-center spring.

12. The marine vehicle of claim 8, wherein the boat side support structure is behind the rear surface of the seatback.

13. The marine vehicle of claim 12, wherein the boat side support structure is a pontoon support.

14. A marine vehicle comprising:
a boat assembly, the boat assembly comprising a hull, a floor, and seating,
the seating comprising:
a seat, the seat comprising a seat pad and a seat frame for supporting the seat pad thereon;
a seatback disposed at a rear portion of the seat, the seatback comprising a base portion and a movable cover, the base portion comprising a bottom wall and a plurality of side walls, the bottom wall and the plurality of side walls defining a storage compartment in the base portion, and the movable cover being configured to cover an opening into the storage compartment in the base portion, the movable cover being movable between an open position permitting access to the storage compartment and a closed position preventing access to the storage compartment; and
a hinge assembly constructed and arranged to movably connect the movable cover to the base portion,
wherein the seat frame is fixed relative to the floor on which the seat frame is mounted.

15. The marine vehicle of claim 14, wherein the seat frame cannot move in any direction or any angle relative to the floor on which the seat frame is mounted.

16. The seating and storage system of claim 4, wherein the four-bar linkage mechanism of the hinge assembly includes two pivoting links, each pivoting link is pivotally connected to the cover and the base portion, respectively, and wherein one end of the over-center spring is attached to one of the two pivoting links and the other end of the over-center spring is attached to the other of the two pivoting links.

17. The seating and storage system of claim 16, wherein the four-bar linkage mechanism of the hinge assembly further includes a cover mounting link constructed and arranged to be fixedly connected to the cover and a base portion mounting link constructed and arranged to be fixedly connected to the base portion, wherein one of the two pivoting links is longer than the other of the two pivoting links, and wherein the difference in the lengths between two pivoting links combined with the length of the cover mounting link and the length of the base portion mounting link enable the hinge assembly to move the cover between the open and the closed positions such that, in the fully open position, the cover is entirely positioned on the seat side of the rear surface of the seat back.

18. The seating and storage system of claim 4, wherein the over-center spring is configured to facilitate the opening of the cover and is also configured to stop the cover from slamming closed.

19. The seating and storage system of claim 4, wherein the over-center spring is configured to retain the cover in the closed position.

20. The seating and storage system of claim 1, wherein the hinge assembly is constructed and arranged to move the cover substantially vertically so that an arc of the cover does not substantially encompass the seat, this allows an occupant to remain seated on the seat while accessing the storage compartment.

21. The seating and storage system of claim 1, wherein the hinge assembly includes a spring assist drive linkage mechanism, and wherein the spring assist drive mechanism is configured to operate as an over-center mechanism to retain the cover in the open position and/or to retain the cover in the closed position.

22. The marine vehicle of claim 14, wherein the seat frame of the seat is configured to remain fixed, under the weight of a user seated on the seat pad of the seat, relative to the floor or the boat deck on which the seat is mounted.

23. The marine vehicle of claim 14, wherein the hinge assembly is configured such that the storage compartment is accessed while a user is seated on the seat pad of the seat.

24. The marine vehicle of claim 14, wherein the hinge assembly is configured to move the cover substantially vertically so that an arc of the cover does not substantially encompass the seat pad of the seat, this allows a user to remain seated on the seat pad of the seat while accessing the storage compartment.

25. The marine vehicle of claim 14, wherein the seat pad of the seat has a width dimension of 18½ inches, wherein an arc of the tip of the seatback moves 2¾ inches forwardly, in the direction of the seat, and wherein a seat width dimension of 15¾ inches is still left for a user to comfortably sit on the seat pad of the seat when opening the seat back.

26. The marine vehicle of claim 25, wherein the seat width dimension of 15¼ inches is still left for the user so that the user sitting on the seat pad of the seat does not need to move or get up from the seat when opening the seat back.

27. The seating and storage compartment of claim 1, wherein the opening in the base portion includes an upwardly facing opening and a forwardly facing opening and wherein the movable cover is configured to cover the upwardly facing opening and the forwardly facing opening in the base portion.

28. The marine vehicle of claim 8, wherein the opening in the base portion includes an upwardly facing opening and a forwardly facing opening and wherein the movable cover is configured to cover the upwardly facing opening and the forwardly facing opening in the base portion.

29. The marine vehicle of claim 14, wherein the opening in the base portion includes an upwardly facing opening and a forwardly facing opening and wherein the movable cover is configured to cover the upwardly facing opening and the forwardly facing opening in the base portion.

* * * * *